United States Patent
Kim et al.

(10) Patent No.: US 12,474,624 B2
(45) Date of Patent: Nov. 18, 2025

(54) CAMERA MODULE WITH REINFORCED LENS DRIVING DEVICE

(71) Applicant: SAMSUNG ELECTRO-MECHANICS CO., LTD., Suwon-si (KR)

(72) Inventors: Su Kyeong Kim, Suwon-si (KR); Soo Cheol Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 495 days.

(21) Appl. No.: 17/978,464

(22) Filed: Nov. 1, 2022

(65) Prior Publication Data

US 2023/0205054 A1 Jun. 29, 2023

(30) Foreign Application Priority Data

Dec. 29, 2021 (KR) .................. 10-2021-0190974

(51) Int. Cl.
*G03B 17/02* (2021.01)
*G02B 27/64* (2006.01)
*G03B 5/00* (2021.01)
*G03B 13/36* (2021.01)
*H02K 41/035* (2006.01)

(52) U.S. Cl.
CPC .......... *G03B 17/02* (2013.01); *G02B 27/646* (2013.01); *G03B 5/00* (2013.01); *G03B 13/36* (2013.01); *H02K 41/0354* (2013.01); *G03B 2205/0007* (2013.01); *G03B 2205/0069* (2013.01)

(58) Field of Classification Search
USPC ......................................... 359/557
See application file for complete search history.

(56) References Cited

U.S. PATENT DOCUMENTS

| 5,200,776 | A | * | 4/1993 | Sakamoto | G02B 7/10 |
| | | | | | 310/68 B |
| 2010/0238307 | A1 | * | 9/2010 | Lee | H04N 23/687 |
| | | | | | 348/208.7 |
| 2011/0205424 | A1 | * | 8/2011 | Nakashima | G02B 7/08 |
| | | | | | 359/823 |
| 2013/0003520 | A1 | * | 1/2013 | Iijima | G11B 7/0935 |

(Continued)

FOREIGN PATENT DOCUMENTS

| KR | 10-0790717 B1 | 1/2008 |
| KR | 10-2019-0106145 A | 9/2019 |
| KR | 10-2021-0022689 A | 3/2021 |

*Primary Examiner* — Bumsuk Won
*Assistant Examiner* — Seth D Moser
(74) *Attorney, Agent, or Firm* — NSIP Law

(57) ABSTRACT

A camera module is provided. The camera module includes a lens barrel configured to accommodate a lens; a barrel holder coupled to the lens barrel; a driving device configured to drive the barrel holder; and a first reinforcing member integrated with the barrel holder, and configured to support a driving magnet of the driving device, wherein the first reinforcing member includes a body portion disposed to oppose the driving magnet and extending in a length direction of the driving magnet; a first protrusion which extends from a first end of the body portion in a direction opposing a driving coil of the driving device; and a second protrusion which extends from a second end of the body portion in a direction opposite to an extending direction of the first protrusion.

15 Claims, 9 Drawing Sheets

(56) References Cited

U.S. PATENT DOCUMENTS

| | | | |
|---|---|---|---|
| 2017/0017056 A1* | 1/2017 | Park | G02B 7/08 |
| 2022/0210300 A1* | 6/2022 | Seo | H04N 23/51 |
| 2022/0229347 A1* | 7/2022 | Kim | H04N 23/54 |
| 2022/0404683 A1* | 12/2022 | Lee | G03B 5/06 |
| 2023/0086178 A1* | 3/2023 | Hwang | H04N 23/687 |
| | | | 348/208.11 |

* cited by examiner

III-III

CAMERA MODULE WITH REINFORCED LENS DRIVING DEVICE

CROSS-REFERENCE TO RELATED APPLICATIONS

This application claims the benefit under 35 USC § 119(a) of Korean Patent Application No. 10-2021-0190974 filed on Dec. 29, 2021, in the Korean Intellectual Property Office, the entire disclosure of which is incorporated herein by reference for all purposes.

BACKGROUND

1. Field

The following description relates to a camera module with a lens driving device.

2. Description of Related Art

A camera module may include a driving device that drives a lens barrel. For example, a camera module may include a driving device that drives a lens barrel in an optical axis direction or that drives a lens barrel in a direction intersecting an optical axis. The driving device of the camera module may include a driving magnet and a driving coil. The driving magnet and the driving coil may be disposed to oppose a lens barrel and a housing, respectively, and may provide a driving force necessary to drive the lens barrel. However, in the camera module configured as described above, the driving magnet may be easily separated or a component to which the driving magnet is attached may be damaged as the lens barrel and the housing collide due to external impacts or vibrations.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a lens barrel configured to accommodate a lens; a barrel holder coupled to the lens barrel; a driving device configured to drive the barrel holder; and a first reinforcing member, integrated with the barrel holder, and configured to support a driving magnet of the driving device, wherein the first reinforcing member includes: a body portion disposed to oppose the driving magnet and extending in a length direction of the driving magnet; a first protrusion which extends from a first end of the body portion in a direction opposing a driving coil of the driving device; and a second protrusion which extends from a second end of the body portion in a direction opposite to an extending direction of the first protrusion.

A hole or an opening may be formed in the body portion.

The camera module may further include an adhesive member which is applied to the hole or the opening, and which is configured to fix the driving magnet.

An extension length of the first protrusion may be greater than an extension length of the second protrusion.

The first protrusion and the second protrusion may be formed with a distance therebetween in the length direction of the body portion.

The second protrusion may be formed to be longer in a direction away from a center of the body portion.

The camera module may further include a second reinforcing member integrated with the barrel holder and formed in a circumferential direction of the barrel holder.

The second reinforcing member may further include a protrusion which extends in a radial direction of the barrel holder.

The second reinforcing member may be configured to be connected to the first reinforcing member.

In a general aspect, a camera module includes a housing; a first movable frame accommodated in the housing; a second movable frame disposed in the first movable frame; a barrel holder disposed in the second movable frame and including a lens barrel; a first driving device configured to drive the first movable frame in an optical axis direction of the lens; a second driving device configured to drive the second movable frame and the barrel holder in a direction that intersects the optical axis; and a first reinforcing member integrated with the first movable frame, and configured to support a first driving magnet of the first driving device, wherein the first reinforcing member includes: a first body portion that extends in a length direction of the first driving magnet; a first outward protrusion which extends from a first end of the first body portion in a direction opposing a first driving coil of the first driving device; and a first inward protrusion which extends from a second end of the first body portion in a direction opposite to an extending direction of the first outward protrusion.

The camera module may include a second reinforcing member, integrated with the barrel holder, and configured to support a second driving magnet of the second driving device.

The second reinforcing member may include a second body portion which extends in a length direction of the second driving magnet; a second outward protrusion which extends from a first end of the second body portion in a direction opposing the second driving coil of the second driving device; and a second inward protrusion which extends from a second end of the second body portion in a direction opposite to the second outward protrusion.

A first hole may be formed in the first body portion.

The camera module may further include an adhesive member applied to the hole and configured to fix the driving magnet.

The first protrusion comprises a plurality of protrusions formed to extend from an upper end of the body portion in the first direction, and the second protrusion comprises a plurality of protrusions formed to extend from a lower end of the body portion in the direction opposite to the extending direction of the first protrusion.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
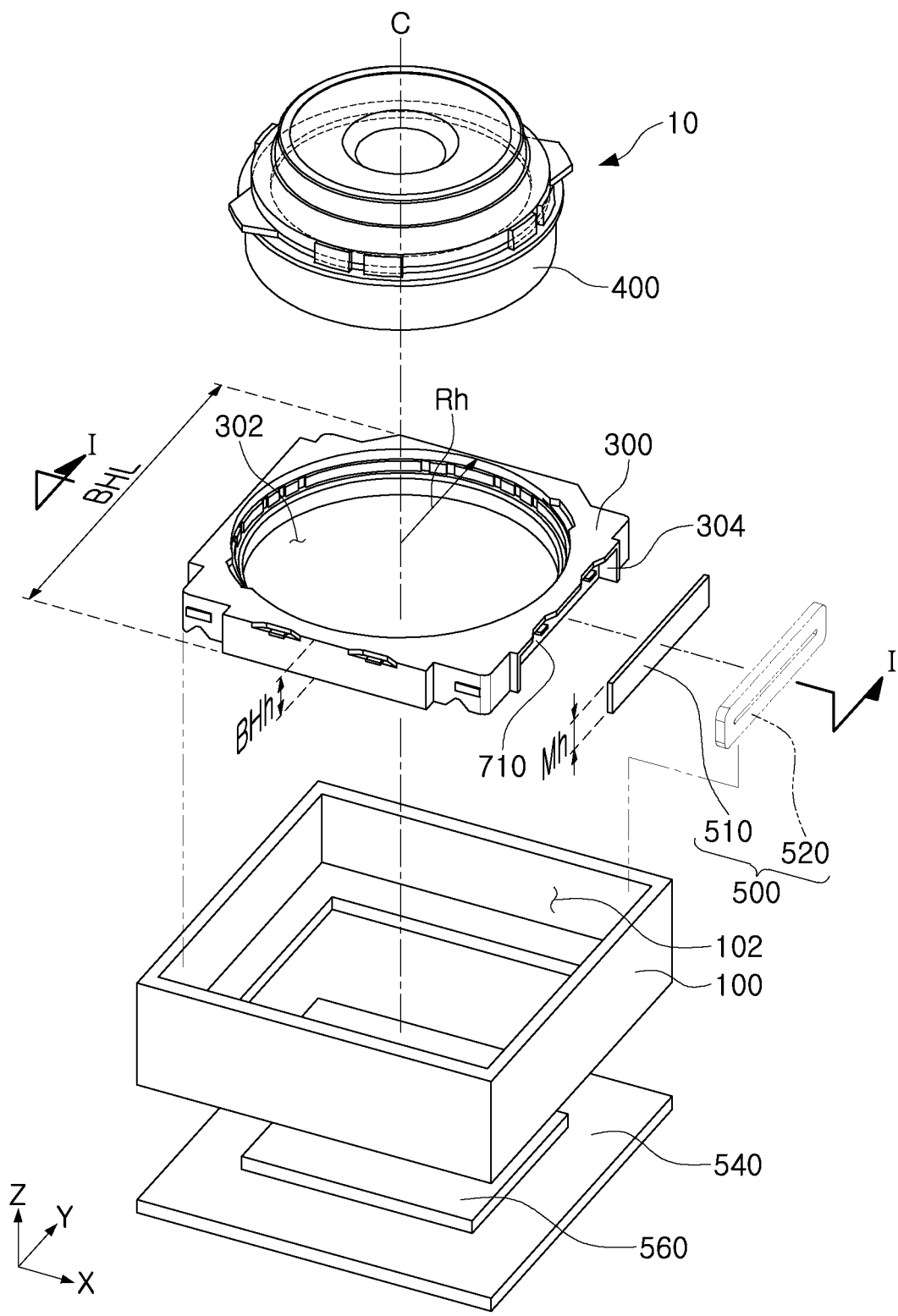
FIG. 1 is a perspective diagram illustrating an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

It is to be understood that structures, shapes, and sizes described as examples in embodiments in the one or more examples are merely examples to help understanding of technical matters of the present disclosure, and thus, are not limited thereto, but various modifications may be made without departing from the spirit and scope of the one or more examples.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In one or more examples, a camera module may reduce or prevent a driving magnet, a major component of a driving device, from being separated by external impacts and vibrations.

A camera module in an example embodiment may be mounted on an electronic device. For example, a camera module may be mounted on, as only examples, a portable terminal, a notebook computer, a virtual reality (VR) device, VR glasses, and the like. However, electronic devices in which a camera module may be mounted are not limited to the aforementioned devices. For example, a camera module may be mounted on portable electronic devices such as a portable game machine.

The example camera module may be configured to address the issue of separation of a driving device due to external impacts or drop impact or vibrations. For example, the camera module may be configured to address the issue of separation of a driving magnet of a driving device from a movable portion by impacts or vibrations. Additionally, the camera module in an example embodiment may be configured to reduce damages caused by collisions between internal components.

To address the issue above, a camera module, in accordance with one or more embodiments, may include a reinforcing member integrated with the lens barrel and the movable frame. The reinforcing member may be integrated with the lens barrel or the movable frame by insert injection or double injection. The reinforcing member may be configured to support the driving magnet. For example, the body portion of the reinforcing member may extend in the length direction of the driving magnet and may be in surface-contact with the driving magnet.

The reinforcing member, in accordance with one or more embodiments, may be configured to reduce distortion or damage of the lens barrel and the movable frame. For example, the reinforcing member may improve rigidity of the lens barrel and the movable frame through one or more protrusions extending from the body portion in different directions.

Hereinafter, an example embodiment of the camera module will be described in detail with reference to the accompanying drawings.

First, a camera module, in accordance with one or more embodiments, will be described with reference to FIGS. 1 to 8.

The camera module 10, in accordance with one or more embodiments, may include a housing 100, a barrel holder 300, a lens barrel 400, a driving device 500, and a reinforcing member 710. However, the components of the camera module 10 are not limited to the aforementioned components. For example, the camera module 10 may further include a substrate 540 on which the image sensor 560 is mounted.

The housing 100 may be configured to accommodate main components of the camera module 10. For example, the housing 100 may accommodate the barrel holder 300, the lens barrel 400, and the driving device 500 in the accommodation space 102 formed therein. The accommodation space 102 may be formed in an open shape along the optical axis C. The accommodation space 102 may enable movement of the barrel holder 300 and the lens barrel 400. For example, the accommodation space 102 may be formed to have a significant size such that movement of the barrel holder 300 and the lens barrel 400 in the optical axis C direction or in a direction intersecting the optical axis C may be possible.

The housing 100 may be configured such that the driving device 500 may be disposed. For example, one side of the housing 100 may be opened, or a support structure having a predetermined shape may be formed on one side of the housing 100 such that a portion of components (e.g., a driving coil) of the driving device 500 may be disposed. However, the above-described support structure is not necessarily formed on one side of the housing 100. For example, a portion of components of the driving device 500 may be fixed to the housing 100 through a fastening device or an adhesive device. Meanwhile, since the "housing 100" described herein may be a term encompassing an entirety of members configured to accommodate the barrel holder 300 and the lens barrel 400, the term may be replaced with another type of member or term configured to accommodate the barrel holder 300 and the lens barrel 400. For example, the housing 100 in an example embodiment may be the same component as a case, a container, a carrier, and the like.

The barrel holder 300 may be configured to be coupled to the lens barrel 400. For example, the barrel holder 300 may include an opening 302 for coupling to the lens barrel 400. The opening 302 may have substantially the same shape and the same size as those of the cross-section of the lens barrel 400. Accordingly, the lens barrel 400 may be firmly fixed to the opening 302 of the barrel holder 300. However, the coupling between the barrel holder 300 and the lens barrel 400 is not limited to coupling by insertion. For example, for firm coupling between the barrel holder 300 and the lens barrel 400, an adhesive may be injected into the coupling portion between the barrel holder 300 and the lens barrel 400, or alternately, the barrel holder 300 and the lens barrel 400 may be fused using a heat source such as a laser.

The barrel holder 300 may include a component to support or accommodate a portion of components (e.g., a driving magnet) of the driving device 500. For example, a seating portion 304 that accommodates a portion of components of the driving device 500, may be formed on one side surface of the barrel holder 300. The seating portion 304 may be formed to have a size in which the seating portion 304 may accommodate the driving magnet of the driving device 500. However, the seating portion 304 is not necessarily formed on one side surface of the barrel holder 300. Meanwhile, the barrel holder 300 described herein may encompass an entirety of members configured to be integrally driven with the lens barrel 400 and is not limited to the terminology. For example, the barrel holder 300 in an example embodiment may be the same as a lens carrier, a lens holder, and the like.

The lens barrel 400 may include a lens L. For example, the lens barrel 400 may include one or more lenses L disposed in order along the optical axis C. The lens barrel 400 may be configured to image incident light on the image sensor 810. As a specific example, light incident through the lens L of the lens barrel 400 may be imaged on the image sensor 810. The lens barrel 400 may include a device that adjusts the amount of incident light. For example, the lens barrel 400 may further include a stop (not illustrated) disposed on an object side of the frontmost lens or between the lenses. Meanwhile, the lens barrel 400 illustrated in FIG. 1 may have an almost cylindrical shape, but the exterior shape of the lens barrel 400 is not limited to a cylindrical shape. For example, the lens barrel 400 may be configured to have a hexahedral shape.

The driving device 500 may be configured to drive the barrel holder 300 and the lens barrel 400. For example, the driving device 500 may drive the barrel holder 300 and the lens barrel 400 in the optical axis C direction. The driving device 500 may include a driving magnet 510 and a driving coil 520. However, the components of the driving device 500 are not limited to the driving magnet 510 and the driving coil 520.

The driving device 500 may be disposed in the housing 100 and the barrel holder 300. For example, the driving magnet 510 may be disposed on the barrel holder 300, and the driving coil 520 may be disposed on the housing 100. The driving magnet 510 and the driving coil 520 may be disposed to oppose each other. For example, the driving magnet 510 may be disposed on one surface of the barrel holder 300, and the driving coil 520 may be disposed on an internal side surface of the housing 100 opposing the driving magnet 510. Meanwhile, in the drawings, a single driving magnet 510 and a single driving coil 520 may be disposed in the barrel holder 300 and the housing 100, respectively, but if desired, two or more driving magnets 510 and two or more driving coils 520 may be disposed in the barrel holder 300 and the housing 100.

The driving device 500 may be firmly fixed to the lens barrel 300 and the housing 100. For example, the driving magnet 510 may be integrated with the barrel holder 300 or may be firmly fixed to the barrel holder 300 through the reinforcing member 710. The driving coil 520 may be fixed to the housing 100 by a substrate. For example, the driving coil 520 may be attached to the internal side surface of the housing 100 by a flexible substrate. As another example, the driving coil 520 may be integrated with the housing 100 by a mold interconnected device (MID) method.

Figure 2:
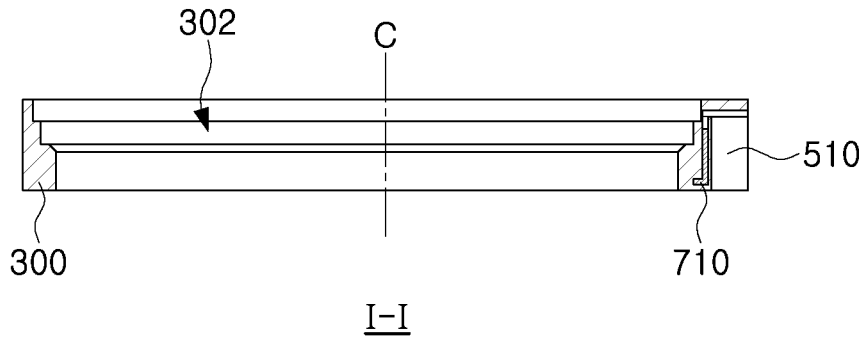
FIG. 2 is a cross-sectional diagram illustrating a barrel holder illustrated in FIG. 1.

The reinforcing member 710 may be integrated with the barrel holder 300. For example, the reinforcing member 710 may be integrated with the barrel holder 300 through insert injection or double injection. The reinforcing member 710 may be configured to improve rigidity of the barrel holder 300. For example, the reinforcing member 710 may be formed of a material having high strength and rigidity, such that rigidity of a weak portion of the barrel holder 300 may improve. The reinforcing member 710 may be configured to support the driving magnet 510. For example, the reinforcing member 710 may be configured to support one surface of the driving magnet 510 as illustrated in FIG. 2.

Hereinafter, a structure of the reinforcing member 710 will be described in greater detail with reference to FIG. 3.

In a non-limiting example, the reinforcing member 710 may be formed of a material having predetermined elasticity and rigidity. For example, the reinforcing member 710 may be formed of a metal material. However, the material of the reinforcing member 710 is not limited to a metal. The reinforcing member 710 may include a body portion 712, a first protrusion 714, and a second protrusion 716. However, the components of the reinforcing member 710 are not limited to the body portion 712, the first protrusion 714, and the second protrusion 716. For example, a third protrusion may be further formed on the side surface of the reinforcing member 710. The body portion 712, the first protrusion 714, and the second protrusion 716 of the reinforcing member 710 may be integrated with each other through a series of processes. For example, the reinforcing member 710 may be rapidly formed through a single process through a pressing process. However, the method of forming the reinforcing member 710 is not limited to the pressing process.

The body portion 712 may be configured to improve torsional rigidity of the barrel holder 300. For example, the body portion 712 may extend in a plane direction parallel to the optical axis C and may prevent or reduce twisting deformation of the barrel holder 300. The body portion 712 may be formed to have a substantial length. For example, the length TD of the body portion 712 may be greater than or equal to the length ML of the driving magnet 510. As another example, the length TD of the body portion 712 may be less than or equal to the length BHL of the barrel holder 300 in one side direction. However, the length TD of the body portion 712 is not limited to the above-described size relationship. The body portion 712 may have a predetermined height Th. For example, the height Th of the body portion 712 may be greater than or equal to the height Mh of the driving magnet 510. As another example, the height Th of the body portion 712 may be smaller than the height BHh of the barrel holder 300. However, the height Th of the body portion 712 is not limited to the above-described size relationship.

A groove 7122 may be formed in the body portion 712. The groove 7122 may increase a binding force between the body portion 712 and the barrel holder 300. Specifically, a portion of the barrel holder 300 may be inserted into the groove 7122 of the body portion 712 or a portion of the barrel holder 300 may be integrated by double injection molding such that coupling force between the body portion 712 and the barrel holder 300 may increase.

The first protrusion 714 may be formed on one end of the body portion 712. For example, the first protrusion 714 may be formed on the upper end of the body portion 712. The first protrusion 714 may be formed to extend to one side. For example, the first protrusion 714 may extend in a direction opposing the driving magnet 510 or the driving coil 520. In one or more examples, the first protrusion 714 may be formed as a single protrusion 714 or multiple first protrusions 714. The first protrusions 714 may be formed with a predetermined distance therebetween. For example, two first protrusions 714 may be formed with a predetermined distance therebetween in the length direction of the body portion 712. Meanwhile, in FIG. 3, the two first protrusions 714 may be formed on the body portion 712, but the number of the first protrusions 714 may increase to three or more if desired.

The first protrusion 714 may be configured to reduce the separation of the driving magnet 510 from the barrel holder 300. For example, the first protrusion 714 may be in close contact with the rear and upper surfaces of the driving magnet 510 together with the body portion 712, and may reduce the separation of the driving magnet 510 from the barrel holder 300. The first protrusion 714 may be configured to align the positions of the driving magnets 510. For example, the first protrusion 714 may be configured to be in contact with one side (e.g., an upper surface) of the driving magnet 510 and may align positions of the driving magnet 510 in the optical axis direction.

The second protrusion 716 may be formed on one end of the body portion 712. For example, the second protrusion 716 may be formed on the lower end of the body portion 712. The second protrusion 716 may be formed to extend to one side. For example, the second protrusion 716 may be formed to be oriented or extended in a direction opposite to the extending direction of the first protrusion 714. In an example, the second protrusion 716 may be continuously formed in the length direction of the body portion 712. However, the number of the second protrusions 716 formed on the body portion 712 is not limited to one as illustrated in FIG. 3. For example, if desired, two or more second protrusions 714 may be formed with a distance therebetween in the length direction of the body portion 712.

The second protrusion 716 may extend in a predetermined size. For example, the extended length D2 of the second protrusion 716 may be smaller than the extended length D1 of the first protrusion 714. However, the extended length D2 of the second protrusion 716 is not necessarily smaller than the extended length D1 of the first protrusion 714. For example, the extended length D1 of the second protrusion 716 may increase or decrease within a range in which double injection between the reinforcing member 710 and the barrel holder 300 is possible.

The second protrusion 716 may improve the rigidity of the barrel holder 300. For example, the second protrusion 716 may extend in a direction that intersects the body portion 712, and may prevent warpage of the body portion 712 and distortion of the barrel holder 300 due to external impacts.

The reinforcing member 710 according to the example embodiment may be changed if desired. A modified form of the reinforcing member 710 will be described with reference to FIGS. 4 and 5.

First, a reinforcing member according to a first modified example will be described with reference to FIG. 4.

The reinforcing member 710*a* according to the modified example may be configured in a shape substantially similar to a shape of the reinforcing member 710 illustrated in FIG.

2. For example, the reinforcing member 710a may include a body portion 712, a first protrusion or first protrusions 714, and a second protrusion 716. However, the components of the reinforcing member 710a according to the modified example is not limited to the body portion 712, the first protrusion portion 714, and the second protrusion portion 716.

The reinforcing member 710a according to the modified example may be distinguished from the reinforcing member 710 described above in terms of the shape of the body portion 712. For example, the body portion 712 of the reinforcing member 710a according to the modified example may be configured to improve a binding force with the driving magnet 510. As a specific example, one or more holes 7124 may be formed in the body portion 712 of the reinforcing member 710a according to the modified example as illustrated in FIG. 4. The hole 7124 of the body portion 712 may improve a binding force between the reinforcing member 710a and the driving magnet 510. For example, the hole 7124 of the body portion 712 may provide a space in which the adhesive member 730 may be applied, thereby improving a binding force between the reinforcing member 710a and the driving magnet 510. As another example, the hole 7124 of the body portion 712 may provide a space in which the barrel holder 300 may be in direct contact with the driving magnet 510, such that double injection molding of the barrel holder 300 and the driving magnet 510 may be performed. The latter form may increase a coupling force between the barrel holder 300 and the reinforcing member 710a and the driving magnet 510.

In the description below, a reinforcing member according to a second example embodiment will be described with reference to FIG. 5.

Figure 3:
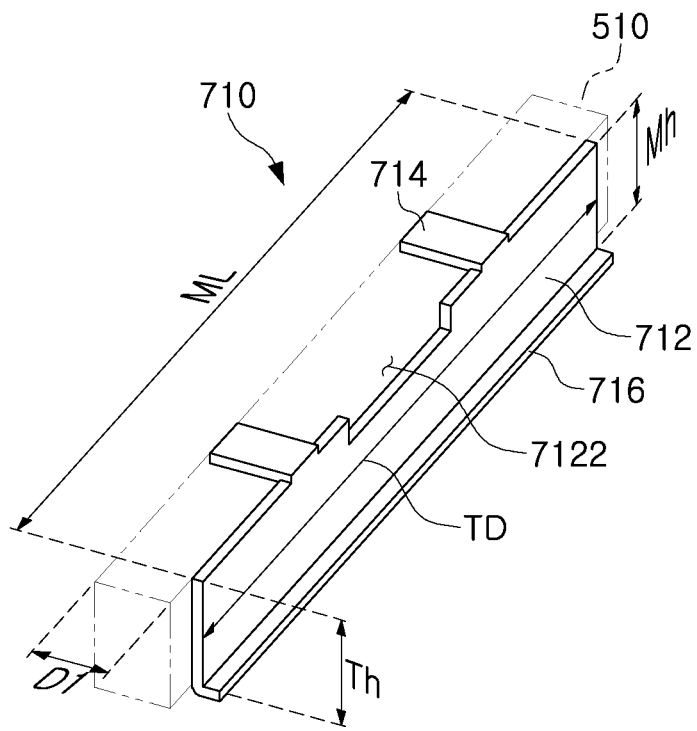
FIG. 3 is a perspective diagram illustrating a reinforcing member illustrated in FIG. 2.

The reinforcing member 710b according to the modified example may be configured in a shape that is substantially similar to a shape of the reinforcing member 710 illustrated in FIG. 3. For example, the reinforcing member 710b may include a body portion 712, a first protrusion or protrusions 714, and a second protrusion 716. However, the components of the reinforcing member 710b according to the modified example are not limited to the body portion 712, the first protrusion portion 714, and the second protrusion portion 716.

Figure 4:
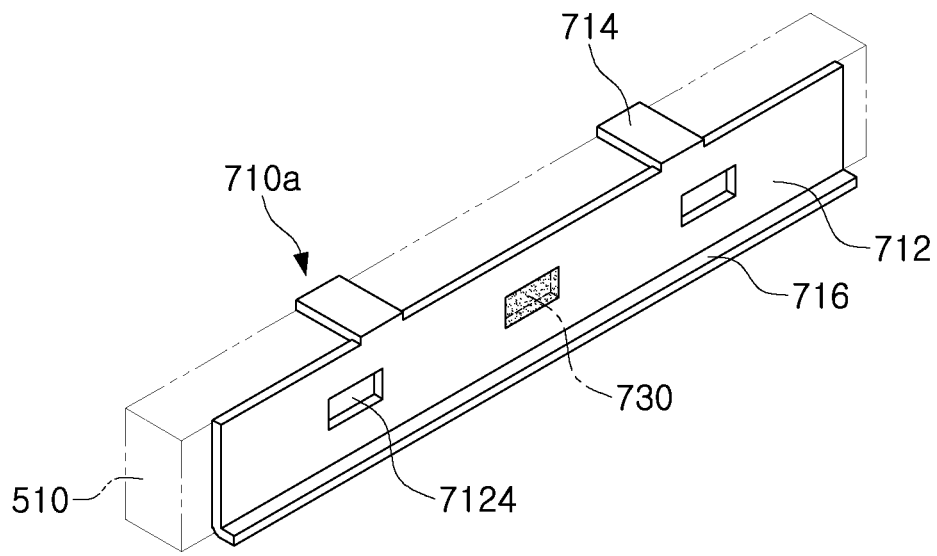
FIG. 4 and FIG. 5 are perspective diagrams illustrating a modified example of a reinforcing member.

The reinforcing member 710b according to the modified example may be distinguished from the above-described reinforcing members 710, illustrated in FIG. 3, and 710a, illustrated in FIG. 4, in terms of the shape of the second protrusion 716. For example, the second protrusion 716 of the reinforcing member 710b according to the modified example may be formed to be longer in a direction away from the center (e.g., the bisector Tc of the body portion 712) of the body portion 712 as illustrated in FIG. 5. As a specific example, the length D21 of the second protrusion 7162 formed in the center of the body portion 712 may be less than the length D22 of the adjacent second protrusion 7164, and the length D22 of the second protrusion 7164 may be smaller than the length D23 of the second protrusion 7166 formed in the outermost portion. The second protrusion 716 formed as described above may effectively reduce the moment of inertia acting on the reinforcing member 710b and the barrel holder 300.

The camera module 10, in accordance with one or more embodiments, may further include a reinforcing member other than the reinforcing member of the above-described form. For example, the camera module 10 may further include a second reinforcing member that has a different shape together with the first reinforcing member 710 having the shape illustrated in FIG. 2. Hereinafter, the shape of the second reinforcing member will be described in greater detail with reference to FIG. 6.

Figure 6:
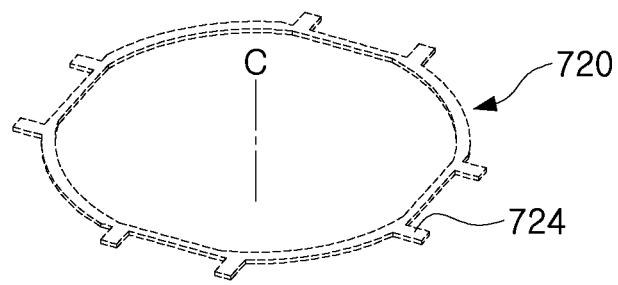
FIG. 6 is a perspective diagram illustrating another modified example of a reinforcing member.

The second reinforcing member 720 may be formed in a shape similar to the cross-sectional shape of the barrel holder 300, as illustrated in FIG. 6. For example, the cross-sectional shape of the second reinforcing member 720 may be almost annular. As another example, the second reinforcing member 720 may have a ring shape that extends in the circumferential direction of the barrel holder 300. However, the cross-sectional shape of the second reinforcing member 720 is not limited to an annular shape or a ring shape.

The second reinforcing member 720 may be formed so as not to affect the shape and form of the barrel holder 300. For example, the inner radius Ri of the second reinforcing member 720 may be greater than the radius Rh of the opening 302 formed in the barrel holder 300. That is, the size of the opening 302 formed in the barrel holder 300 may be maintained at a constant size regardless of the presence or absence of the second reinforcing member 720. The second reinforcing member 720 may include a protrusion 724 that protrudes in a radial direction of the barrel holder or an outer direction of the barrel holder. The protrusion 724 may improve rigidity of the second reinforcing member 720 and rigidity of the barrel holder 300.

The second reinforcing member 720 may be formed of a material having predetermined elasticity and rigidity. For example, the second reinforcing member 720 may be formed of a metal material. However, the material of the second reinforcing member 720 is not limited to a metal. The second reinforcing member 720 may be integrated with the barrel holder 300. For example, the second reinforcing member 720 may be integrated with the barrel holder 300 through insert injection or double injection.

The second reinforcing member 720 may be configured to improve rigidity of the barrel holder 300. For example, the second reinforcing member 720 may be integrated with the barrel holder 300 and may maintain the opening 302 of the barrel holder 300 to have a constant size and shape, and may reduce damage and distortion of the barrel holder 300 due to an external impact.

Hereinafter, a modified form of the barrel holder will be described with reference to FIG. 7.

The camera module 10 according to the example embodiment may include a barrel holder 300a which has a form that is different from a form of the barrel holder 300 of the above-described example. However, the shapes of the barrel holders 300 and 300a included in the camera module 10 according to the example embodiment are not limited to the shapes illustrated in FIGS. 1 and 7.

Figure 5:
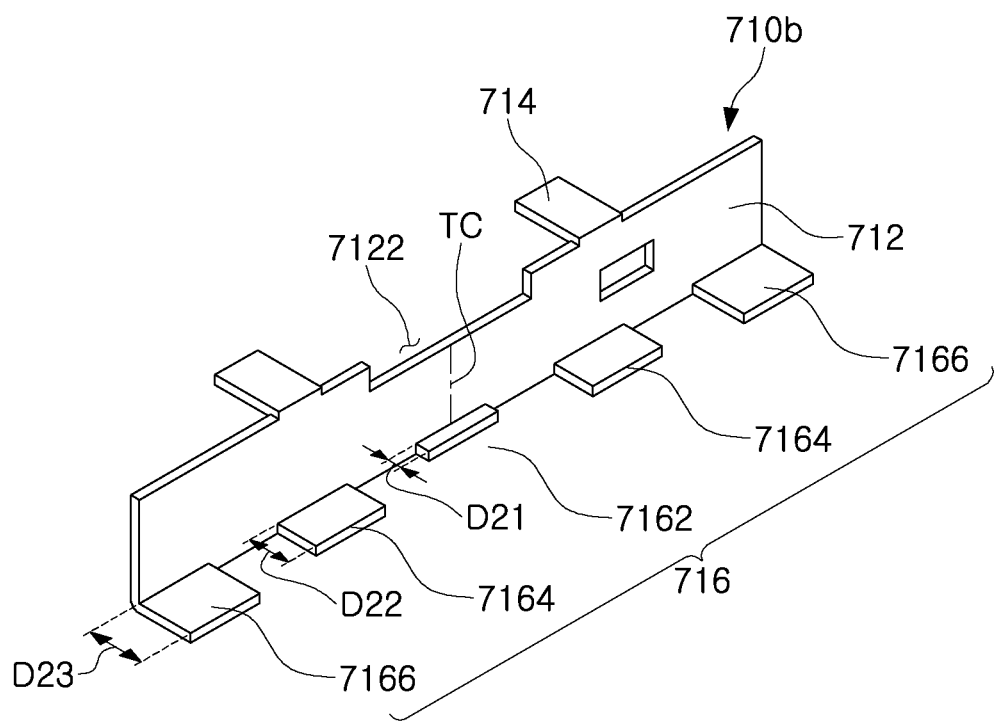

The barrel holder 300a according to the modified example may include the first reinforcing members 710, 710a, and 710b illustrated in FIGS. 3 to 5 and the second reinforcing member 720 illustrated in FIG. 6. For example, the barrel holder 300a according to the modified example may include the first reinforcing member 710 illustrated in FIG. 3 and the second reinforcing member 720 illustrated in FIG. 6. As another example, the barrel holder 300a according to the modified example may include the first reinforcing member 710a illustrated in FIG. 4 and the second reinforcing member 720 illustrated in FIG. 6. As another example, the barrel holder 300a according to the modified example may include the first reinforcing member 710b illustrated in FIG. 5 and the second reinforcing member 720 illustrated in FIG. 6. However, the modified form of the barrel holder 300a is not limited to the above-described combination.

Figure 7:
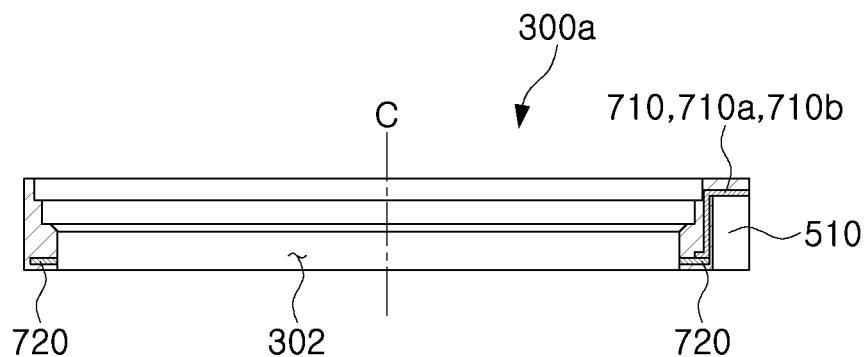
FIG. 7 is a cross-sectional diagram illustrating a barrel holder including a reinforcing member illustrated in FIG. 6.

The barrel holder 300a according to the modified example may include the first reinforcing members 710, 710a, and 710b and the second reinforcing member 720 stacked in the vertical direction as illustrated in FIG. 7. The first reinforcing members 710, 710a and 710b and the second reinforcing member 720 may be integrated in the barrel holder 300a. For example, the first reinforcing member 710, 710a, and 710b and the second reinforcing member 720 may be integrated with the barrel holder 300a through insert injection or double injection.

In an example, the barrel holder 300a illustrated in FIG. 7 may include a first reinforcing member 710, 710a, and 710b and a second reinforcing member 720, but the number of the first reinforcing members 710, 710a and 710b and the second reinforcing member 720 included in the barrel holder 300a is not limited to one. For example, the barrel holder 300a may include two first reinforcing members 710, 710a, and 710b and one second reinforcing member 720, or one first reinforcing member 710, 710a, and 710b and two second reinforcing members 720. Meanwhile, in the barrel holder 300a according to the former example, two first reinforcing members 710, 710a, and 710b may be disposed symmetrically about the optical axis C, and in the barrel holder 300a according to the latter example, the two second reinforcing members 720 may be disposed vertically symmetrically about the driving magnet 510.

The first reinforcing member 710, 710a, and 710b and the second reinforcing member 720 may be connected or coupled to each other to improve rigidity of the barrel holder 300a. For example, the first reinforcing member 710, 710a, and 710b and the second reinforcing member 720 may be integrated by processes such as, but not limited to, welding, bonding, or the like. As another example, the first reinforcing member 710, 710a, and 710b and the second reinforcing member 720 may be firmly coupled by insertion. However, the first reinforcing members 710, 710a and 710b and the second reinforcing member 720 are not necessarily physically connected or coupled to each other. For example, the first reinforcing members 710, 710a, and 710b and the second reinforcing member 720 may be disposed in the barrel holder 300a with a predetermined distance therebetween.

Since the barrel holder 300a configured as above may have a structure in which a plurality of reinforcing members 710, 710a, and 710b, and 720 support the shape and form of the barrel holder 300a, breakage or deformation of the barrel holder 300a due to external impact and drop impact may be significantly reduced.

In the description below, a coupling form of the camera module 10 will be described with reference to FIG. 8.

Figure 8:
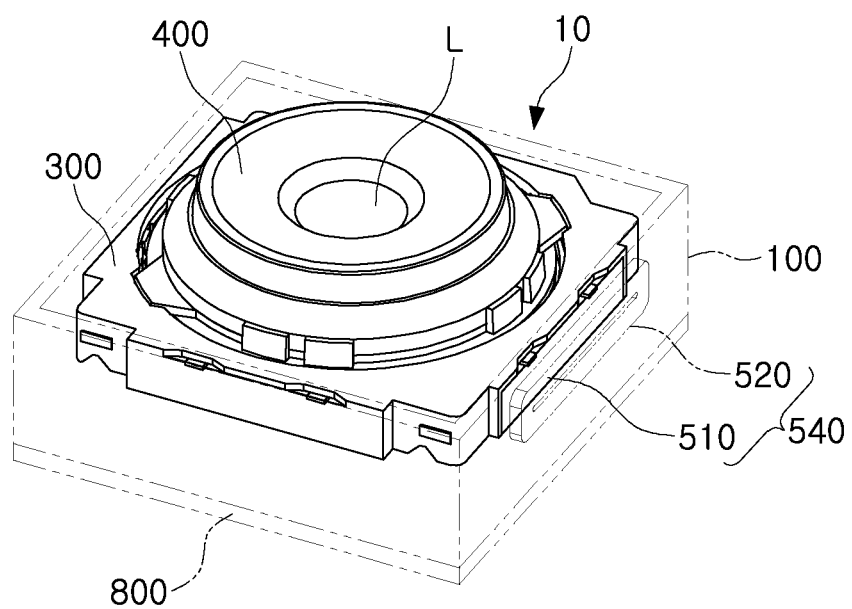
FIG. 8 is a perspective diagram illustrating the camera module illustrated in FIG. 1.
Figure 9:
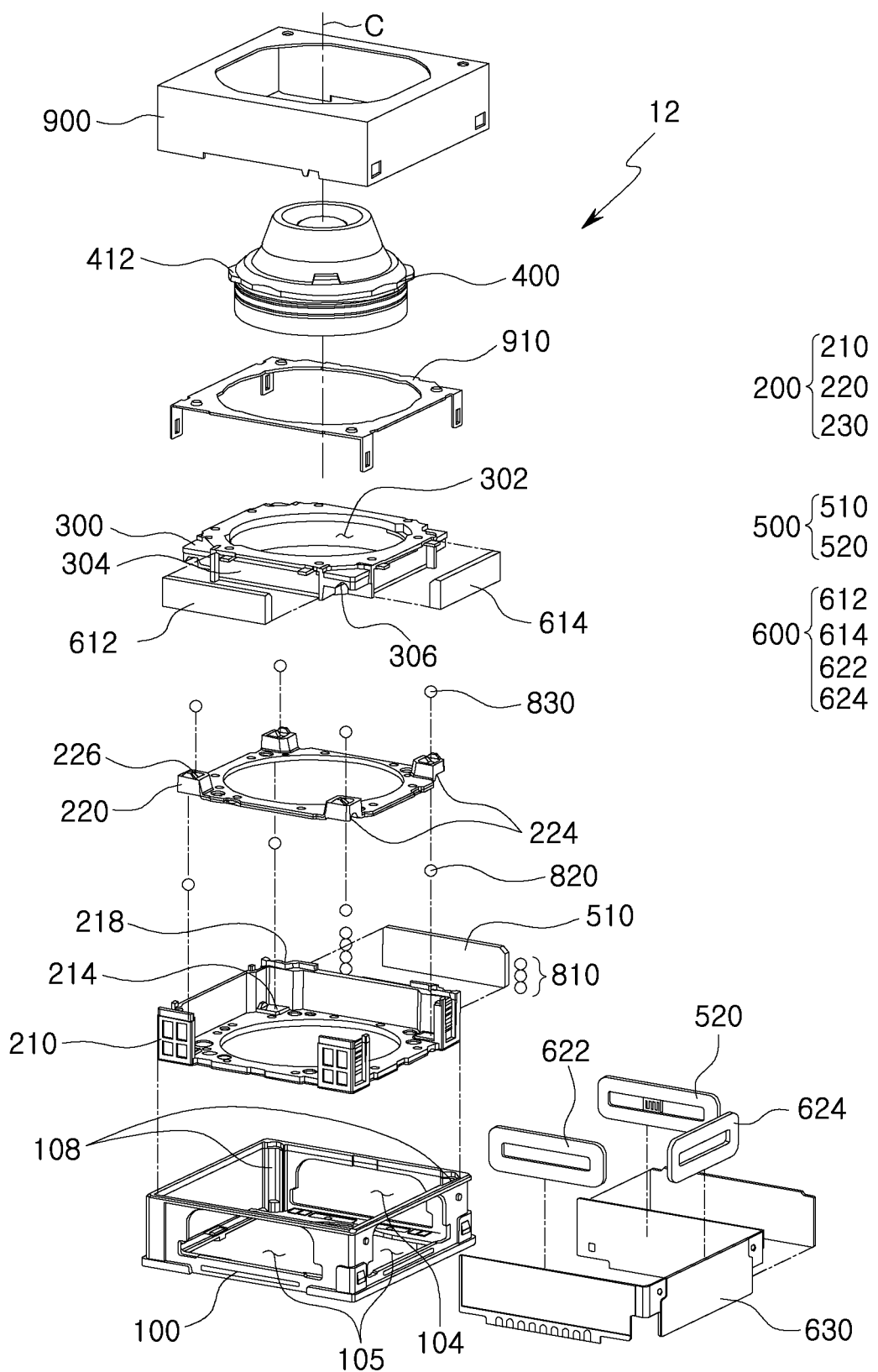
FIG. 9 is a perspective diagram illustrating another example embodiment of a camera module.

The camera module 10 may be configured in a form in which the above-described components are integrally combined as illustrated in FIG. 8. Additionally, the camera module 10 may be formed to have a relatively small height as illustrated in FIG. 8. Therefore, the camera module 10 according to the example embodiment may be easily mounted in a thin-sized small terminal such as a smartphone.

The camera module 10 according to the example embodiment may reduce the separation of the driving magnet 510 and the breakage of the barrel holder 300 by rapid movement and vibrations of the barrel holder 300 and the lens barrel 400. Specifically, in the camera module 10 according to the example embodiment, since the driving magnet 510 is firmly fixed to the barrel holder 300 by the reinforcing member 710, the separation of the driving magnet 510 due to external impact and drop impact may be significantly reduced. Also Additionally, since the camera module 10 according to the example embodiment has a structure in which one or more reinforcing members 710, 710a, and 710b, and 720 may improve rigidity of the barrel holder 300, breakage of the barrel holder 300 may be significantly reduced.

In the description below, a camera module according to another example embodiment will be described with reference to FIGS. 9 to 16.

The camera module 12 according to the example embodiment may include a housing 100, a first movable frame 210, a second movable frame 220, a barrel holder 300, a lens barrel 400, a first driving a device 500 and a second driving device 600. However, the components of the camera module 120 are not limited to the above-described members. For example, the camera module 12 may further include ball bearings 810, 820, and 830, a shield 900, and a fixing clip 910.

The housing 100 may be configured to accommodate the first movable frame 210, the second movable frame 220, the barrel holder 300, and the lens barrel 400. The housing 100 may accommodate the first movable frame 210 to enable movement of the first movable frame 210. Ball bearings 810 may be disposed between the housing 100 and the first movable frame 210. More specifically, the ball bearings 810 may be disposed between the guide groove 108 of the housing 100 and the groove 218 of the first movable frame 210, such that movement of the first movable frame 210 in the optical axis C direction may be smoothly performed. Openings 104 and 105 may be formed in at least three side surfaces of the housing 100. Driving device 500 and 600 may be disposed in the openings 104 and 105, respectively. Specifically, the driving magnet 510 of the first driving device 500 and the driving coil 520 may be disposed to oppose each other in first opening 104, and the driving magnets 612 and 614 of the second driving device 600 and the driving coils 622 and 624 may be disposed to oppose each other in the two second openings 105.

The first movable frame 210 may be configured to support the second movable frame 220. The first movable frame 210 may support the second movable frame 220 such that the second movable frame 220 may move. For example, the first movable frame 210 may support the second movable frame 220 such that the second movable frame 220 may move in a direction intersecting the optical axis C. Friction between the first movable frame 210 and the second movable frame 220 may be reduced by the ball bearing 820. The ball bearing 820 may be disposed between the groove 214 of the first movable frame 210 and the groove 224 of the second movable frame 220. The grooves 214 and 224 may be formed to limit the moving direction of the second movable frame 220. For example, the grooves 214 and 224 may be formed to extend in a second direction intersecting the optical axis C, such that the moving direction of the second movable frame 220 may be limited to the second direction intersecting the optical axis C.

The first driving device 500 may be disposed on the first movable frame 210. Specifically, the first driving magnet 510 of the first driving device 500 may be disposed on the first side surface of the first movable frame 210. Additionally, a ball bearing 810 may be disposed on the first side surface of the first movable frame 210. More specifically, the ball bearing 810 may be disposed in the groove 218 of the first side surface. The first movable frame 210 may be formed in an open shape, opened in a direction in which at least two side surfaces intersect the optical axis C. For example, two side surfaces of the first movable frame 210 adjacent to each other may be partially opened such that the second driving magnets 612 and 614 mounted on the barrel holder 300 may oppose the second driving coils 622 and 624.

The first movable frame 210 may be configured to be driven in a direction different from the driving direction of the barrel holder 300 and the second movable frame 220. For example, the first movable frame 210 may be driven in the optical axis C direction by an operation of the first driving device 500. The first movable frame 210 may be configured to accommodate the barrel holder 300 and the second movable frame 220. For example, in the internal space of the first movable frame 210, the second movable frame 220 and the barrel holder 300 may be disposed in order in the optical axis C direction. Accordingly, when the first movable frame 210 moves in the optical axis C direction, the second movable frame 220 and the barrel holder 300 may also move together in the optical axis C direction. Since the barrel holder 300 and the second movable frame 220 are movable only in the internal space of the first movable frame 210, the movement of the barrel holder 300 and the second movable frame 220 may not affect the driving of the first movable frame 210.

The second movable frame 220 may support the barrel holder 300 such that the movement of the barrel holder 300 may be performed. For example, the second movable frame 220 may support the barrel holder 300 such that the barrel holder 300 may move in a first direction intersecting the optical axis C. A ball bearing 830 that facilitates movement of the barrel holder 300 may be disposed between the second movable frame 220 and the barrel holder 300. More specifically, the ball bearing 830 may be disposed between the groove 306 of the barrel holder 300 and the groove 226 of the second movable frame 220. The grooves 226 and 306 may limit the movement direction of the barrel holder 300. For example, the grooves 226 and 306 may extend in a first direction intersecting the optical axis C and may limit the movement direction of the barrel holder 300 to the first direction intersecting the optical axis C.

The first movable frame 210 and the second movable frame 220 may be configured to support the barrel holder 300. For example, the second movable frame 220 may be configured to support the barrel holder 300, and the first movable frame 210 may be configured to support the barrel holder 300 by the second movable frame 220.

The barrel holder 300 may be configured to be coupled to the lens barrel 400. For example, the barrel holder 300 may include an opening 302 that allows insertion of the lens barrel 400 in the center of the barrel holder 300 thereof. The opening 302 may be opened in the optical axis C direction. The center of the opening 302 may coincide with the optical axis C of the lens barrel 400. The barrel holder 300 may be configured to accommodate a portion of the second driving device 500. For example, the barrel holder 300 may include mounting grooves 304 in which the second driving magnets 612 and 614 of the second driving device 600 are disposed on two side surfaces thereof, respectively.

The lens barrel 400 may be formed in a truncated cone shape. However, the shape of the lens barrel 400 is not limited to a truncated cone. For example, the lens barrel 400 may have a cylindrical shape or may have other shapes. The lens barrel 400 may be configured to accommodate a lens. For example, one or more lenses stacked in order along the optical axis C may be disposed in the lens barrel 400.

The first driving device 500 may include a first driving magnet 510 and a first driving coil 520. The first driving magnet 510 may be disposed in the first movable frame 210, and the first driving coil 520 may be disposed in the first opening 104 of the housing 100. The first driving magnet 510 and the first driving coil 520 may provide a driving force necessary to move the first movable frame 210 in the optical axis C direction. Specifically, the first movable frame 210 may move in the optical axis C direction based on the first driving magnet 510 and the first driving coil 520. The first movable frame 210 may move together with the lens barrel 400 accommodated therein. Accordingly, the focus adjustment of the camera module 12 may be naturally performed according to the movement of the first movable frame 210 in the optical axis C direction.

The second driving device 600 may include second driving magnets 612 and 614 and second driving coils 622 and 624. The second driving magnets 612 and 614 may be disposed in the barrel holder 300, and the second driving coils 622 and 624 may be disposed in the second opening 105 of the housing 100. The second driving magnets 612 and 614 and the second driving coils 622 and 624 may provide a driving force necessary for the barrel holder 300 to move in a direction intersecting the optical axis C. Specifically, the second driving magnet 612 and the second driving coil 622 may drive the barrel holder 300 in a first direction intersecting the optical axis C, and the second driving magnet 614 and the second driving coil 624 may drive the second movable frame 220 and the barrel holder 300 in a second direction that intersects the optical axis C. Accordingly, the optical image stabilization of the camera module 12 may be naturally performed by the movement of the barrel holder 300 driven by the second driving device 600.

The flexible substrate 630 may be configured to support the first driving coil 520 and the second driving coils 622 and 624. For example, the flexible substrate 630 may fix the first driving coil 520 and the second driving coils 622 and 624 to an external side of the housing 100 such that the first driving coil 520 and the second driving coils 622 and 624 may oppose the first driving magnet 510 and the second driving coils 612 and 614. The flexible substrate 630 may be configured to provide a current and control signals to the first and second driving coils 520 and 622 and 624. For example, the flexible substrate 630 may be connected to an external power source and an external control device and may supply a current and control signals to the first and second driving coils 520 and 622 and 624.

The fixing clip 910 may be configured to prevent separation of the barrel holder 300 and the second movable frame 220 from the first movable frame 210. For example, the fixing clip 910 may be coupled to the first movable frame 210 in a state in which the upper portion of the barrel holder 300 is pressed, such that the barrel holder 300 and the second movable frame 220 may be prevented from being separated from the first movable frame 210.

The shield 900 may be configured to shield a partial region of an upper portion and four side surfaces of the housing 100. The shield 900 may be configured to prevent malfunctioning of the camera module 12 due to harmful electromagnetic waves. For example, the shield 900 may be formed of a metal material to block magnetic field interference of the first driving device 500 and the second driving device 600 caused by harmful electromagnetic waves.

The camera module 12, in accordance with one or more embodiments, may be configured to reduce deformation of the first movable frame 210 due to external impacts and drop impact. For example, the camera module 12 according to the example embodiment may further include a component that improves rigidity of the first movable frame 210. Hereinafter, the structure of the first movable frame 210 will be described in greater detail with reference to FIGS. 10 and 11.

Figure 10:
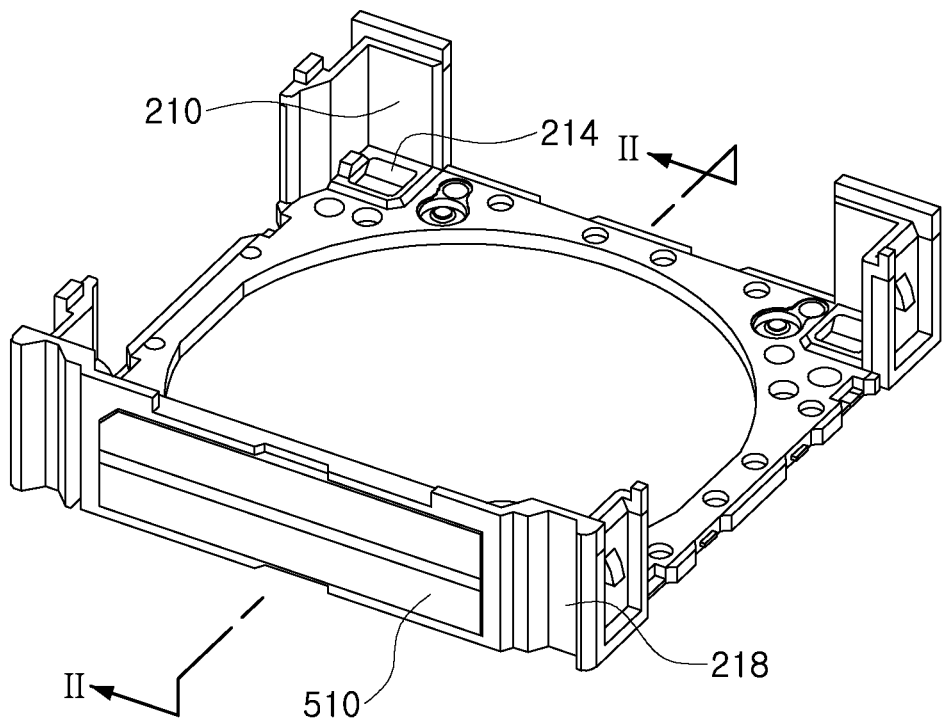
FIG. 10 is an enlarged diagram illustrating a first movable frame illustrated in FIG. 9.

Since the first driving magnet 510 is disposed on one side of the first movable frame 210 as illustrated in FIG. 10, the weight of the portion on which the first driving magnet 510 is disposed may be heavier than the other portion. Therefore, when external impact is applied to the first movable frame 210, the portion on which the first driving magnet 510 is disposed may be deformed or the portion on which the first driving magnet 510 is disposed may be easily damaged.

Figure 11:
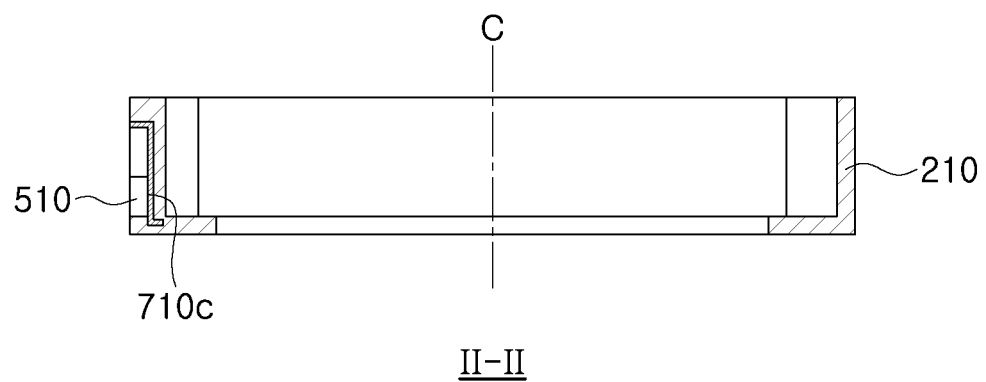
FIG. 11 is a cross-sectional diagram illustrating a first movable frame illustrated in FIG. 10.

In consideration of the above issue, the camera module 12 according to the example embodiment further may include a first reinforcing member 710c disposed in the first movable frame 210 as illustrated in FIG. 11.

In an example, the first reinforcing member 710c may be formed on one side of the first movable frame 210. For example, the first reinforcing member 710c may be formed on one side of the first movable frame 210 on which the first driving magnet 510 is disposed. The first reinforcing member 710c may be integrated with the first movable frame 210. For example, the first reinforcing member 710c may be integrated with the first movable frame 210 through, as examples, insert injection or double injection. The first reinforcing member 710c may be configured to improve rigidity of the first movable frame 210. For example, the first reinforcing member 710c may be formed of a material having high strength and rigidity, and may improve rigidity of the weak portion of the first movable frame 210. The first reinforcing member 710c may be configured to support the first driving magnet 510. For example, the first reinforcing member 710c may be configured to support one surface of the first driving magnet 510 as illustrated in FIG. 11.

Figure 12:
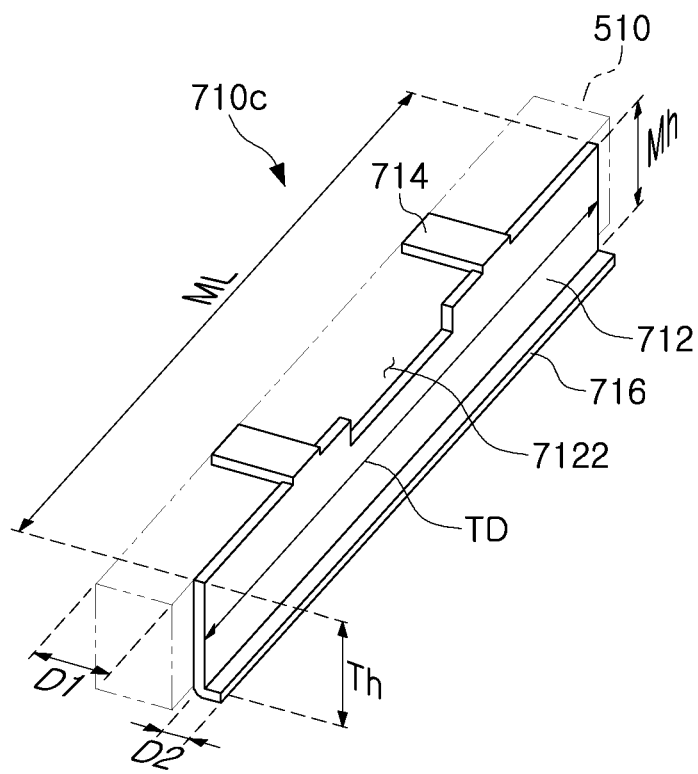
FIG. 12 is a perspective diagram illustrating a first reinforcing member illustrated in FIG. 11.

Hereinafter, the structure of the first reinforcing member 710c will be described in greater detail with reference to FIG. 12.

The first reinforcing member 710c may be formed of a material having predetermined elasticity and rigidity. For example, the first reinforcing member 710c may be formed of a metal material. However, the material of the first reinforcing member 710c is not limited to a metal. The first reinforcing member 710c may include a first body portion 712, a first outward protrusion or first outward protrusions 714, and a first inward protrusion 716. However, the components of the first reinforcing member 710c are not limited to the first body portion 712, the first outward protrusion or protrusions 714, and the second inward protrusion 716. The first body portion 712, the first outward protrusion 714, and the second inward protrusion 716 of the first reinforcing member 710c may be integrated with each other through a series of processes. For example, the first reinforcing member 710c may be rapidly formed by a single process through a pressing process. However, the method of forming the first reinforcing member 710c is not limited to the pressing process.

The first body portion 712 may be configured to improve torsional rigidity of the first movable frame 210. For example, the first body portion 712 may extend in a plane direction parallel to the optical axis C and may prevent or reduce twist deformation of the first movable frame 210. The first body portion 712 may be formed to a considerable length. For example, the length TD of the first body portion 712 may be greater than or equal to the length ML of the first driving magnet 510. However, the length TD of the first body portion 712 is not limited to the above-described size relationship. The first body portion 712 may have a predetermined height Th. For example, the height Th of the first body portion 712 may be greater than or equal to the height Mh of the first driving magnet 510. However, the height Th of the first body portion 712 is not limited to the above-described size relationship.

A groove 7122 may be formed in the first body portion 712. The groove 7122 may increase a binding force between the first body portion 712 and the first movable frame 210. Specifically, a portion of the first movable frame 210 may be inserted into the groove 7122 of the first body portion 712 or a portion of the first movable frame 210 may be integrated by injection molding such that coupling force between the first body portion 712 and the first movable frame 210 may increase.

The first outward protrusion 714 may be formed on one end of the first body portion 712. For example, the first outward protrusion 714 may be formed on the upper end of the first body portion 712. The first outward protrusion 714 may extend to one side. For example, the first outward protrusion 714 may extend in a direction opposing the first driving magnet 510 or the second driving coil 520. The first outward protrusions 714 may be formed with a predetermined distance therebetween. For example, the two first outward protrusions 714 may be formed with a predetermined distance therebetween in the length direction of the first body portion 712. Meanwhile, the two first outward protrusions 714 may be formed on the first body portion 712 in the drawings, but the number of the first outward protrusions 714 may increase to three or more if desired.

The first outward protrusion 714 may be configured to reduce the separation of the first driving magnet 510 from the first movable frame 210. For example, the first outward protrusion 714 may be in close contact with the rear and upper surfaces of the first driving magnet 510 together with the first body portion 712, such that the separation of the first driving magnet 510 from the first moving frame 210 may be reduced. The first outward protrusion 714 may be configured to align the positions of the first driving magnets 510. For example, the first outward protrusion 714 may be configured to be in contact with one side surface (e.g., an upper surface) of the driving magnet 510 and may align positions of the first driving magnet 510 in the optical axis direction.

The first inward protrusion 716 may be formed on one end of the first body portion 712. For example, the first inward protrusion 716 may be formed on the lower end of the first body portion 712. The first inward protrusion 716 may extend to one side. For example, the first inward protrusion 716 may extend in a direction opposite to the extending direction of the first outward protrusion 714. In an example, the first inward protrusion 716 may be continuously formed in the length direction of the first body portion 712. However, the number of the first inward protrusions 716 formed on the first body portion 712 is not limited to one as illustrated in FIG. 12. For example, two or more first inward protrusions 716 may be formed with a distance therebetween in the length direction of the body portion 712 if desired.

The first inward protrusion 716 may extend in a predetermined size or length. For example, the extended length D2 of the first inward protrusion 716 may be smaller than the extended length D1 of the first outward protrusion 714. However, the extension length D2 of the first inward protrusion 716 is not necessarily smaller than the extension length D1 of the first outward protrusion 714. For example, the extended length D1 of the first inward protrusion 716 may increase or decrease within a range in which double injection between the first reinforcing member 710c and the first movable frame 210 may be performed.

The first inward protrusion 716 may improve rigidity of the first movable frame 210. For example, the first inward protrusion 716 may extend in a direction intersecting the first body portion 712 and may prevent warpage of the first body portion 712 and distortion of the first movable frame 210 due to external impacts.

The camera module 12, in accordance with one or more embodiments, may be configured to reduce deformation of the barrel holder 300 based on external impacts and drop impact. For example, the camera module 12 according to the example embodiment may further include a component that improves rigidity of the barrel holder 300. The structure of the barrel holder 300 will be described in greater detail with reference to FIGS. 13 to 15.

Figure 13:
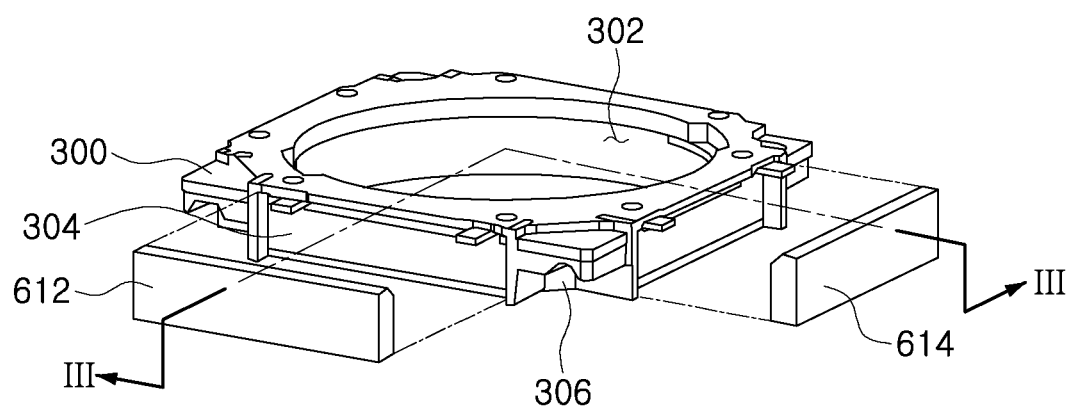
FIG. 13 is an enlarged diagram illustrating a second movable frame illustrated in FIG. 9.

Since the second driving magnets 612 and 622 having a significant weight may be disposed on two adjacent side surfaces of the barrel holder 300 as illustrated in FIG. 13, external impacts or external forces may be concentrated on the portion in which the second driving magnets 612 and 622. Additionally, the external impacts and external forces concentrated on the portion in which the second driving magnets 612 and 622 are disposed may likely cause rapid breakage of the barrel holder 300 or deformation of the barrel holder 300.

Figure 14:
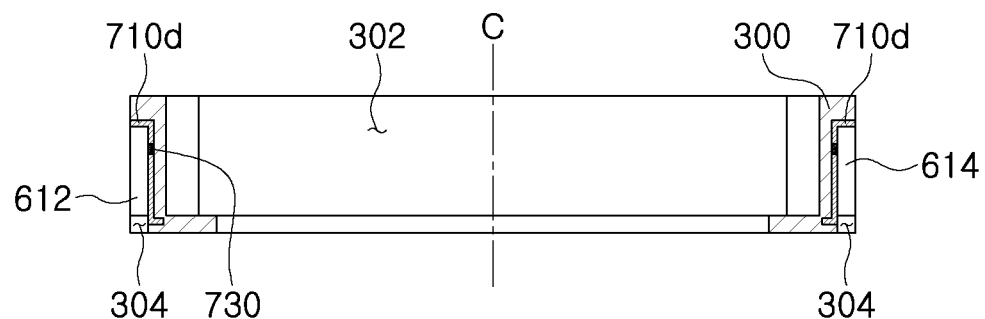
FIG. 14 is a cross-sectional diagram illustrating a second movable frame illustrated in FIG. 13.

The camera module 12, in accordance with one or more embodiments, may further include a second reinforcing member 710d disposed in the lens barrel 300 as illustrated in FIG. 14 to address the issue described above.

The second reinforcing member 710d may be formed on at least two side surfaces of the barrel holder 300. For example, the second reinforcing member 710d may be formed on the first side surface and the second side surface of the barrel holder 300 on which the second driving magnets 612 and 622 are disposed. The second reinforcing member 710d may be integrated with the barrel holder 300. For example, the second reinforcing member 710d may be integrated with the barrel holder 300 through, as examples, insert injection or double injection. The second reinforcing member 710d may be configured to improve rigidity of the barrel holder 300. For example, the second reinforcing member 710d may be formed of a material having high strength and rigidity, such that rigidity of the weak portion of the barrel holder 300 may improve. The second reinforcing member 710d may be configured to support the second driving magnets 612 and 622. For example, the second reinforcing member 710d may be configured to support one surface of the second driving magnets 612 and 622 as illustrated in FIG. 14.

Figure 15:
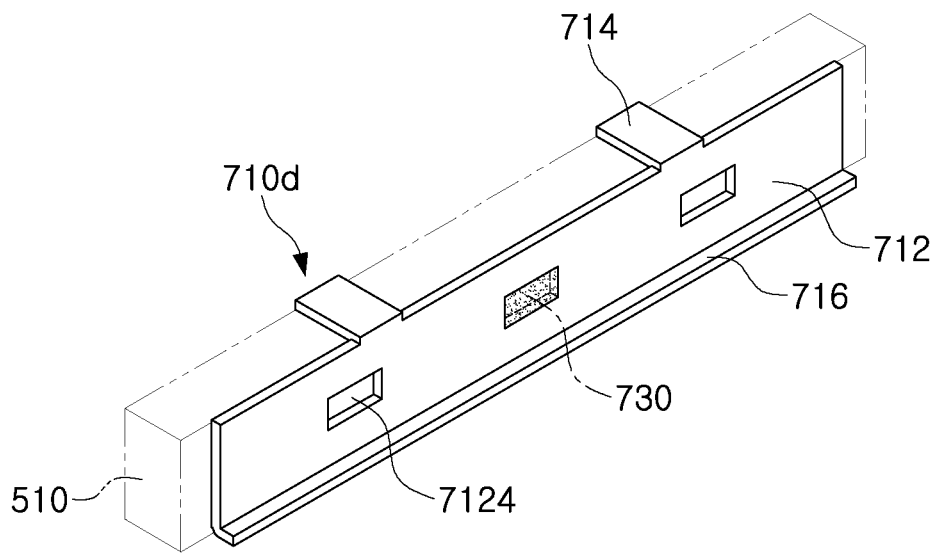
FIG. 15 is a perspective diagram illustrating a second reinforcing member illustrated in FIG. 14.
Figure 16:
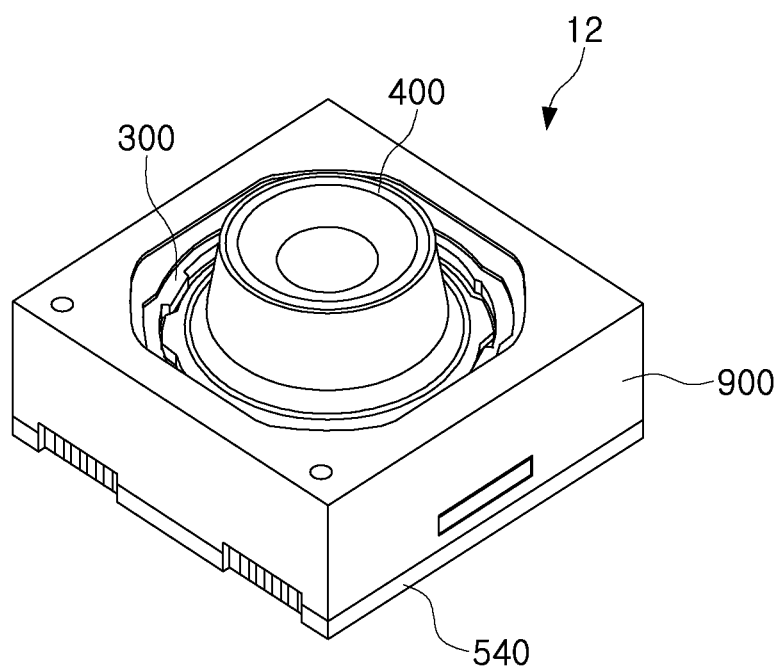
FIG. 16 is a perspective diagram illustrating the camera module illustrated in FIG. 9.

Hereinafter, the structure of the second reinforcing member 710d will be described in greater detail with reference to FIG. 15.

The second reinforcing member 710d may be formed of a material having predetermined elasticity and rigidity. For example, the second reinforcing member 710d may be formed of a metal material. However, the material of the second reinforcing member 710d is not limited to a metal. The second reinforcing member 710d may include a second body portion 712, a second outward protrusion 714, and a second inward protrusion 716. However, the components of the second reinforcing member 710d are not limited to the second body portion 712, the second outward protrusion 714, and the second inward protrusion 716. The second body portion 712, the second outward protrusion 714, and the second inward protrusion 716 of the second reinforcing member 710d may be integrated through a series of processes. For example, the second reinforcing member 710d may be rapidly formed through a single process through a pressing process. However, the method of forming the second reinforcing member 710d is not limited to the pressing process.

The second body portion 712 may be configured to improve torsional rigidity of the barrel holder 300. For example, the second body portion 712 may extend in a plane direction parallel to the optical axis C, and may prevent or reduce twisting deformation of the barrel holder 300. The second body portion 712 may be formed to a considerable length. For example, the length TD of the second body portion 712 may be greater than or equal to the length ML of the second driving magnets 612 and 622. However, the length TD of the second body portion 712 is not limited to the above-described size relationship. The second body portion 712 may have a predetermined height Th. For example, the height Th of the second body portion 712 may be greater than or equal to the height Mh of the second driving magnets 612 and 622. However, the height Th of the second body portion 712 is not limited to the above-described size relationship.

A hole or holes 7124 may be formed in the second body portion 712. The hole 7124 may increase binding force between the barrel holder 300 and the second driving magnets 612 and 622. Specifically, an adhesive member 730 that increases coupling force between the barrel holder 300 and the second driving magnets 612 and 622 may be injected or coated in the hole 7124 of the second body portion 712.

The second outward protrusion 714 may be formed on one end of the second body portion 712. For example, the second outward protrusion 714 may be formed on the upper end of the second body portion 712. The second outward protrusion 714 may be formed to extend to one side. For example, the second outward protrusion 714 may extend in a direction opposing the first driving magnet 510 or the second driving coil 520. The second outward protrusions 714 may be formed to be spaced apart from each other. For example, the two second outward protrusions 714 may be formed with a predetermined distance therebetween in the length direction of the second body portion 712. Meanwhile, two second outward protrusions 714 may be formed on the second body portion 712 in FIG. 15, but the number of second outward protrusions 714 may increase to three or more if desired.

The second outward protrusion 714 may be configured to reduce the separation of the second driving magnets 612 and 622 from the barrel holder 300. For example, the second outward protrusion 714 may be in close contact with the rear and upper surfaces of the second driving magnets 612 and 622 together with the second body portion 712, such that the separation of the second driving magnets 612 and 622 from the barrel holder 300 may be prevented. The second outward protrusion 714 may be configured to align the positions of the second driving magnets 612 and 622. For example, the second outward-opposing protrusion 714 may be configured to be in contact with one side surface (e.g., an upper surface) of the second driving magnets 612 and 622 in the optical axis direction of the second driving magnets 612 and 622.

The second inward protrusion 716 may be formed on one end of the second body portion 712. For example, the second inward protrusion 716 may be formed on the lower end of the second body portion 712. The second inward protrusion 716 may be formed to extend to one side. For example, the second inward protrusion 716 may extend in a direction opposite to the extending direction of the second outward protrusion 714. The second inward protrusion 716 may be continuously formed in the length direction of the second body portion 712. However, the number of the second inward protrusions 716 formed on the second body portion 712 is not limited to one as illustrated in FIG. 15. For example, if desired, two or more second inward protrusions 716 may be formed with a distance therebetween in the length direction of the body portion 712.

The second inward protrusion 716 may extend in a predetermined size or length. For example, the extended length D2 of the second inward protrusion 716 may be less than the extended length D1 of the second outward protrusion 714. However, the extended length D2 of the second inward protrusion 716 is not necessarily smaller than the extended length D1 of the second outward protrusion 714. For example, the extended length D1 of the second inward protrusion 716 may increase or decrease within a range in which double injection between the second reinforcing member 710d and the barrel holder 300 may be performed.

The second inward protrusion 716 may improve rigidity of the barrel holder 300. For example, the second inward protrusion 716 may extend in a direction intersecting the second body portion 712 and may prevent warpage of the second body portion 712 and distortion of the barrel holder 300 due to external impacts.

In the camera module 12 configured as above, the members (the first movable frame 210 and the barrel holder 300) moving in the optical axis C direction and the direction intersecting the optical axis C may have high rigidity by the reinforcing members 710c and 710d formed of different materials, breakage or deformation of the moveable members by external impacts or drop impact may be significantly reduced. Accordingly, according to the example embodiment, durability of the camera module 12 and driving reliability of the camera module 12 may improve.

According to the aforementioned example embodiments, a camera module which may improve driving reliability of focus adjustment (AF) or an image stabilization (01S) function may be provided.

Additionally, a camera module which may endure external impacts and drop impacts may be provided.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens barrel configured to accommodate a lens;
   a barrel holder coupled to the lens barrel;
   a driving device configured to drive the barrel holder; and
   a first reinforcing member, integrated with the barrel holder, and configured to support a driving magnet of the driving device,
   wherein the first reinforcing member comprises:
   a body portion disposed to oppose the driving magnet and extending in a length direction of the driving magnet;
   a first protrusion which extends from a first end of the body portion in a direction opposing a driving coil of the driving device; and
   a second protrusion which extends from a second end of the body portion in a direction opposite to an extending direction of the first protrusion.

2. The camera module of claim 1, wherein a hole or an opening is formed in the body portion.

3. The camera module of claim 2, further comprising an adhesive member which is applied to the hole or the opening, and which is configured to fix the driving magnet.

4. The camera module of claim 1, wherein an extension length of the first protrusion is greater than an extension length of the second protrusion.

5. The camera module of claim 1, wherein the first protrusion and the second protrusion are formed with a distance therebetween in the length direction of the body portion.

6. The camera module of claim 5, wherein the second protrusion is formed to be longer in a direction away from a center of the body portion.

7. The camera module of claim 1, further comprising a second reinforcing member integrated with the barrel holder and formed in a circumferential direction of the barrel holder.

8. The camera module of claim 7, wherein the second reinforcing member further comprises a protrusion which extends in a radial direction of the barrel holder.

9. The camera module of claim 7, wherein the second reinforcing member is configured to be connected to the first reinforcing member.

10. The camera module of claim 1, wherein the first protrusion comprises a plurality of protrusions formed to extend from an upper end of the body portion in the first direction, and the second protrusion comprises a plurality of protrusions formed to extend from a lower end of the body portion in the direction opposite to the extending direction of the first protrusion.

11. A camera module, comprising:
    a housing;
    a first movable frame accommodated in the housing;
    a second movable frame disposed in the first movable frame;
    a barrel holder disposed in the second movable frame and including a lens barrel;
    a first driving device configured to drive the first movable frame in an optical axis direction of the lens;
    a second driving device configured to drive the second movable frame and the barrel holder in a direction that intersects the optical axis; and
    a first reinforcing member integrated with the first movable frame, and configured to support a first driving magnet of the first driving device,
    wherein the first reinforcing member comprises:
    a first body portion that extends in a length direction of the first driving magnet;
    a first outward protrusion which extends from a first end of the first body portion in a direction opposing a first driving coil of the first driving device; and
    a first inward protrusion which extends from a second end of the first body portion in a direction opposite to an extending direction of the first outward protrusion.

12. The camera module of claim 11, further comprising:
a second reinforcing member, integrated with the barrel holder, and configured to support a second driving magnet of the second driving device.

13. The camera module of claim 12, wherein the second reinforcing member comprises:
a second body portion which extends in a length direction of the second driving magnet;
a second outward protrusion which extends from a first end of the second body portion in a direction opposing the second driving coil of the second driving device; and
a second inward protrusion which extends from a second end of the second body portion in a direction opposite to the second outward protrusion.

14. The camera module of claim 11, wherein a first hole is formed in the first body portion.

15. The camera module of claim 14, further comprising an adhesive member applied to the hole and configured to fix the driving magnet.

* * * * *